(12) United States Patent
Banerjee et al.

(10) Patent No.: US 8,941,961 B2
(45) Date of Patent: Jan. 27, 2015

(54) METHODS AND APPARATUS FOR PROTECTION IN A MULTI-PHASE MACHINE

(71) Applicant: Boulder Wind Power, Inc., Louisville, CO (US)

(72) Inventors: Swarnab Banerjee, Broomfield, CO (US); Brian J. Sullivan, Boulder, CO (US); James S. Smith, Lyons, CO (US)

(73) Assignee: Boulder Wind Power, Inc., Louisville, CO (US)

( * ) Notice: Subject to any disclaimer, the term of this patent is extended or adjusted under 35 U.S.C. 154(b) by 0 days.

(21) Appl. No.: 13/972,325

(22) Filed: Aug. 21, 2013

(65) Prior Publication Data

US 2014/0268460 A1 Sep. 18, 2014

Related U.S. Application Data (60) Provisional application No. 61/782,563, filed on Mar. 14, 2013.

(51) Int. Cl.
*H02H 9/02* (2006.01)

(52) U.S. Cl.
CPC ..................................... *H02H 9/02* (2013.01)
USPC .......................................................... 361/87

(58) Field of Classification Search
USPC .......................................................... 361/87
See application file for complete search history.

(56) References Cited

U.S. PATENT DOCUMENTS

| | | | |
|---|---|---|---|
| 2,015,537 A * | 9/1935 | Silverman | 363/52 |
| 3,555,356 A * | 1/1971 | Kaiser | 361/27 |
| 4,138,705 A | 2/1979 | Doll | |
| 4,256,972 A | 3/1981 | Wyat et al. | |
| 4,357,542 A | 11/1982 | Kirschbaum | |
| 4,375,593 A | 3/1983 | Winterbotham | |
| 4,400,659 A | 8/1983 | Barron et al. | |
| 4,451,775 A | 5/1984 | Phillips et al. | |
| 4,461,957 A | 7/1984 | Jallen | |
| 4,464,579 A | 8/1984 | Schwarz | |
| 4,511,807 A | 4/1985 | Somerville | |
| 4,525,633 A | 6/1985 | Wertheim et al. | |
| 4,625,256 A | 11/1986 | Scuka et al. | |

(Continued)

OTHER PUBLICATIONS

Zanasi, "Optimal Rotor Flux Shape for Multi-phase Permanent Magnet Synchronous Motors," 2008 <URL:http://www.dii.unimore.it/~zanasi/Personale/Papers/P_16_EPE_2008_Zanasi_Grossi.pdf>.

(Continued)

*Primary Examiner* — Rexford Barnie
*Assistant Examiner* — Angela Brooks
(74) *Attorney, Agent, or Firm* — Cooley LLP (57) ABSTRACT

In some embodiments, a system includes multiple coils of a multi-phase machine in which the coils are each associated with a different phase. Associated with each coil is a protective element such that each protective element is associated with a different coil. When its associated protective element is in a first configuration, a coil is part of an electrical circuit, and its associated protective element allows a first amount of current to flow through the coil. Its associated protective element allows a second amount of current to flow through the coil when its associated protective element is in a second configuration. When in the second configuration, the coil's associated protective element does not obstruct current flow through other coils that are not associated with the protective element.

33 Claims, 4 Drawing Sheets

(56) References Cited

U.S. PATENT DOCUMENTS

| | | | |
|---|---|---|---|
| 4,656,413 A | 4/1987 | Bourbeau | |
| 4,841,218 A | 6/1989 | Rosinnes et al. | |
| 4,926,061 A | 5/1990 | Arreola, Jr. | |
| 4,968,861 A | 11/1990 | Kuhn | |
| 4,994,684 A | 2/1991 | Lauw et al. | |
| 5,028,804 A | 7/1991 | Lauw | |
| 5,083,039 A | 1/1992 | Richardson et al. | |
| 5,172,329 A * | 12/1992 | Rahman et al. | 700/293 |
| 5,187,427 A | 2/1993 | Erdman | |
| 5,225,712 A | 7/1993 | Erdman | |
| 5,239,251 A | 8/1993 | Lauw | |
| 5,278,773 A | 1/1994 | Cousineau | |
| 5,289,041 A | 2/1994 | Holley | |
| 5,406,196 A | 4/1995 | Sameshima | |
| 5,418,446 A | 5/1995 | Hallidy | |
| 5,536,976 A | 7/1996 | Churchill | |
| 5,579,217 A | 11/1996 | Deam et al. | |
| 5,627,712 A * | 5/1997 | Wilkinson | 361/63 |
| 5,652,485 A | 7/1997 | Spiegel et al. | |
| 5,786,642 A | 7/1998 | Wilhelm | |
| 5,798,631 A | 8/1998 | Spee et al. | |
| 5,859,520 A * | 1/1999 | Bourgeois et al. | 318/805 |
| 5,880,664 A | 3/1999 | Hollmann et al. | |
| 5,907,192 A | 5/1999 | Lyons et al. | |
| 5,986,438 A | 11/1999 | Wallace et al. | |
| 6,037,758 A | 3/2000 | Perez | |
| 6,121,749 A | 9/2000 | Wills et al. | |
| 6,127,739 A | 10/2000 | Appa | |
| 6,134,124 A | 10/2000 | Jungreis et al. | |
| 6,137,187 A | 10/2000 | Mikhail et al. | |
| 6,175,217 B1 | 1/2001 | Da Ponte et al. | |
| 6,194,793 B1 | 2/2001 | Fisher, Jr. | |
| 6,198,178 B1 | 3/2001 | Schienbein et al. | |
| 6,215,199 B1 | 4/2001 | Lysenko et al. | |
| 6,219,623 B1 | 4/2001 | Wills | |
| 6,252,310 B1 | 6/2001 | Wilhelm | |
| 6,256,212 B1 | 7/2001 | Wobben | |
| 6,282,104 B1 | 8/2001 | Kern | |
| 6,320,731 B1 | 11/2001 | Eaves et al. | |
| 6,326,713 B1 | 12/2001 | Judson | |
| 6,346,797 B1 | 2/2002 | Perreault et al. | |
| 6,407,900 B1 | 6/2002 | Shirakawa et al. | |
| 6,420,795 B1 | 7/2002 | Mikhail et al. | |
| 6,477,025 B1 | 11/2002 | Goldbach et al. | |
| 6,479,907 B1 | 11/2002 | Eriksson et al. | |
| 6,487,096 B1 | 11/2002 | Gilbreth et al. | |
| 6,560,131 B1 | 5/2003 | vonBrethorst | |
| 6,566,764 B2 | 5/2003 | Rebsdorf et al. | |
| 6,583,523 B1 | 6/2003 | Bhate | |
| 6,608,404 B2 | 8/2003 | Schienbein et al. | |
| 6,614,130 B2 | 9/2003 | Wilhelm | |
| 6,634,013 B2 | 10/2003 | Shinzawa | |
| 6,639,328 B2 | 10/2003 | Wacknov | |
| 6,653,744 B2 | 11/2003 | Stricker | |
| 6,671,195 B2 | 12/2003 | Perreault et al. | |
| 6,703,718 B2 | 3/2004 | Calley et al. | |
| 6,720,670 B2 | 4/2004 | Makino et al. | |
| 6,724,097 B1 | 4/2004 | Wobben | |
| 6,750,633 B2 | 6/2004 | Schreiber | |
| 6,759,823 B2 | 7/2004 | Witzig | |
| 6,784,564 B1 | 8/2004 | Wobben | |
| 6,784,634 B2 | 8/2004 | Sweo | |
| 6,787,933 B2 | 9/2004 | Claude et al. | |
| 6,801,027 B2 | 10/2004 | Hann et al. | |
| 6,809,431 B1 | 10/2004 | Schippmann | |
| 6,819,086 B2 | 11/2004 | Wobben | |
| 6,836,028 B2 | 12/2004 | Northrup et al. | |
| 6,838,860 B2 | 1/2005 | Huggett et al. | |
| 6,838,925 B1 | 1/2005 | Nielsen | |
| 6,853,094 B2 | 2/2005 | Feddersen et al. | |
| 6,853,529 B2 * | 2/2005 | Kouwenhoven et al. | 361/117 |
| 6,856,038 B2 | 2/2005 | Rebsdorf et al. | |
| 6,856,039 B2 | 2/2005 | Mikhail et al. | |
| 6,864,658 B1 | 3/2005 | Torrey et al. | |
| 6,900,997 B2 | 5/2005 | Perreault et al. | |
| 6,900,998 B2 | 5/2005 | Erickson et al. | |
| 6,914,763 B2 | 7/2005 | Reedy | |
| 6,924,565 B2 | 8/2005 | Wilkins et al. | |
| 6,924,627 B1 | 8/2005 | Wobben | |
| 6,943,462 B2 | 9/2005 | Wobben | |
| 6,958,550 B2 | 10/2005 | Gilbreth et al. | |
| 7,002,259 B2 | 2/2006 | Howes et al. | |
| 7,023,160 B2 | 4/2006 | Virtanen et al. | |
| 7,038,330 B2 | 5/2006 | Rosebrock et al. | |
| 7,061,133 B1 | 6/2006 | Leijon et al. | |
| 7,087,332 B2 | 8/2006 | Harris | |
| 7,095,130 B2 | 8/2006 | Ichinose et al. | |
| 7,098,550 B2 | 8/2006 | Wobben | |
| 7,102,247 B2 | 9/2006 | Feddersen | |
| 7,102,248 B2 | 9/2006 | Wobben | |
| 7,190,085 B2 | 3/2007 | Moehlenkamp | |
| 7,205,676 B2 | 4/2007 | Ichinose et al. | |
| 7,215,099 B2 | 5/2007 | Ylppo et al. | |
| 7,218,014 B2 | 5/2007 | Steinke | |
| 7,224,081 B2 | 5/2007 | Larsen | |
| 7,227,278 B2 | 6/2007 | Realmuto et al. | |
| 7,233,129 B2 | 6/2007 | Erdman et al. | |
| 7,239,036 B2 | 7/2007 | D'Atre et al. | |
| 7,253,537 B2 | 8/2007 | Weng et al. | |
| 7,274,547 B2 | 9/2007 | Al-Khayat et al. | |
| 7,332,827 B2 | 2/2008 | Nielsen | |
| 7,339,355 B2 | 3/2008 | Erdman et al. | |
| 7,423,412 B2 | 9/2008 | Weng et al. | |
| 7,432,686 B2 | 10/2008 | Erdman et al. | |
| 7,462,947 B2 | 12/2008 | Wobben | |
| 7,514,907 B2 | 4/2009 | Rajda et al. | |
| 7,518,256 B2 | 4/2009 | Juanarena Saragueta et al. | |
| 7,532,490 B2 | 5/2009 | Datta et al. | |
| 7,535,120 B2 | 5/2009 | Erdman et al. | |
| 7,554,303 B1 | 6/2009 | Kawamura | |
| 7,573,732 B2 | 8/2009 | Teichmann et al. | |
| 8,031,455 B2 | 10/2011 | Paik et al. | |
| 8,072,715 B2 | 12/2011 | Dusang, Jr. et al. | |
| 2003/0098666 A1 * | 5/2003 | Shao et al. | 318/727 |
| 2004/0021437 A1 | 2/2004 | Maslov et al. | |
| 2005/0146309 A1 * | 7/2005 | Chen | 322/28 |
| 2008/0309084 A1 * | 12/2008 | Murugesan et al. | 290/3 |
| 2009/0001840 A1 * | 1/2009 | Wolf et al. | 310/203 |
| 2010/0053828 A1 | 3/2010 | Selejan | |
| 2010/0237809 A1 * | 9/2010 | Ogahara | 318/400.13 |
| 2010/0314875 A1 | 12/2010 | Grant | |
| 2011/0002445 A1 | 1/2011 | Hattrup et al. | |
| 2011/0025059 A1 | 2/2011 | Helle et al. | |
| 2011/0075796 A1 | 3/2011 | Loef et al. | |
| 2011/0304351 A1 | 12/2011 | Cop | |

OTHER PUBLICATIONS

International Search Report and Written Opinion for PCT Application No. PCT/US2014/021972 dated Apr. 1, 2014. (11 pages).

* cited by examiner

METHODS AND APPARATUS FOR PROTECTION IN A MULTI-PHASE MACHINE

CROSS-REFERENCE TO RELATED APPLICATION

This application claims priority to and the benefit of U.S. Provisional Patent Application No. 61/782,563, filed Mar. 14, 2013, and entitled "Methods And Apparatus For Protection In A Multi-Phase Machine," which is incorporated herein by reference in its entirety.

BACKGROUND

This invention relates to methods and apparatus for protection in a multi-phase electromagnetic machine such as, for example, protection in a multi-phase stator or rotor winding.

Electrical sources and loads, especially motors and generators, have failure modes and fault conditions that can result in internal and/or external short circuits on the machine. If protection devices are not applied at the correct location or locations on the machine during such a condition, the machine or components attached to the machine can be damaged.

Thus, a need exists for improved systems and methods of protection in a multiphase machine.

SUMMARY

In some embodiments, a system includes multiple coils of a multi-phase machine in which the coils are each associated with a different phase. Each coil is associated with a different protective element. When its associated protective element is in a first configuration, a coil is part of an electrical circuit, and its associated protective element allows a first amount of current to flow through the coil. Its associated protective element allows a second amount of current to flow through the coil when its associated protective element is in a second configuration. When in the second configuration, the coil's associated protective element does not obstruct current flow through other coils not associated with the protective element.

DETAILED DESCRIPTION

In some embodiments, a system includes multiple coils each associated with a different electrical phase in a multi-phase machine. The system also includes multiple protective elements each associated with a different coil such that each coil is part of an electrical circuit when its associated protective element is in a first configuration. In the first configuration, each protective element is configured to allow a first amount of current through its associated coil. When in a second configuration, each protective element is configured to allow a second amount of current through its associated coil. Each protective element is configured to not obstruct current through coils not associated with the protective element.

In other embodiments, a system includes multiple coils each associated with a different electrical phase in a multi-phase machine. The system also includes multiple passive protective elements each arranged in series with a different coil. Each passive protective element is configured to allow a first amount of current through its associated coil when in a first configuration and to allow a second amount of current through its associated coil when in a second configuration.

In other embodiments, a system includes multiple coils each associated with a different electrical phase in a multi-phase machine. The system also includes multiple protective elements each associated with a different coil. The protective elements are each configured to allow a first amount of current through its associated coil when in a first configuration, allow a second amount of current through its associated coil when in a second configuration, and provide an indication to another protective element when the protective element transitions from the first configuration to the second configuration.

As used herein, the singular forms "a," "an" and "the" include plural referents unless the context clearly dictates otherwise. Thus, for example, the term "a coil" is intended to mean a single coil or a combination of coils.

Figure 1:
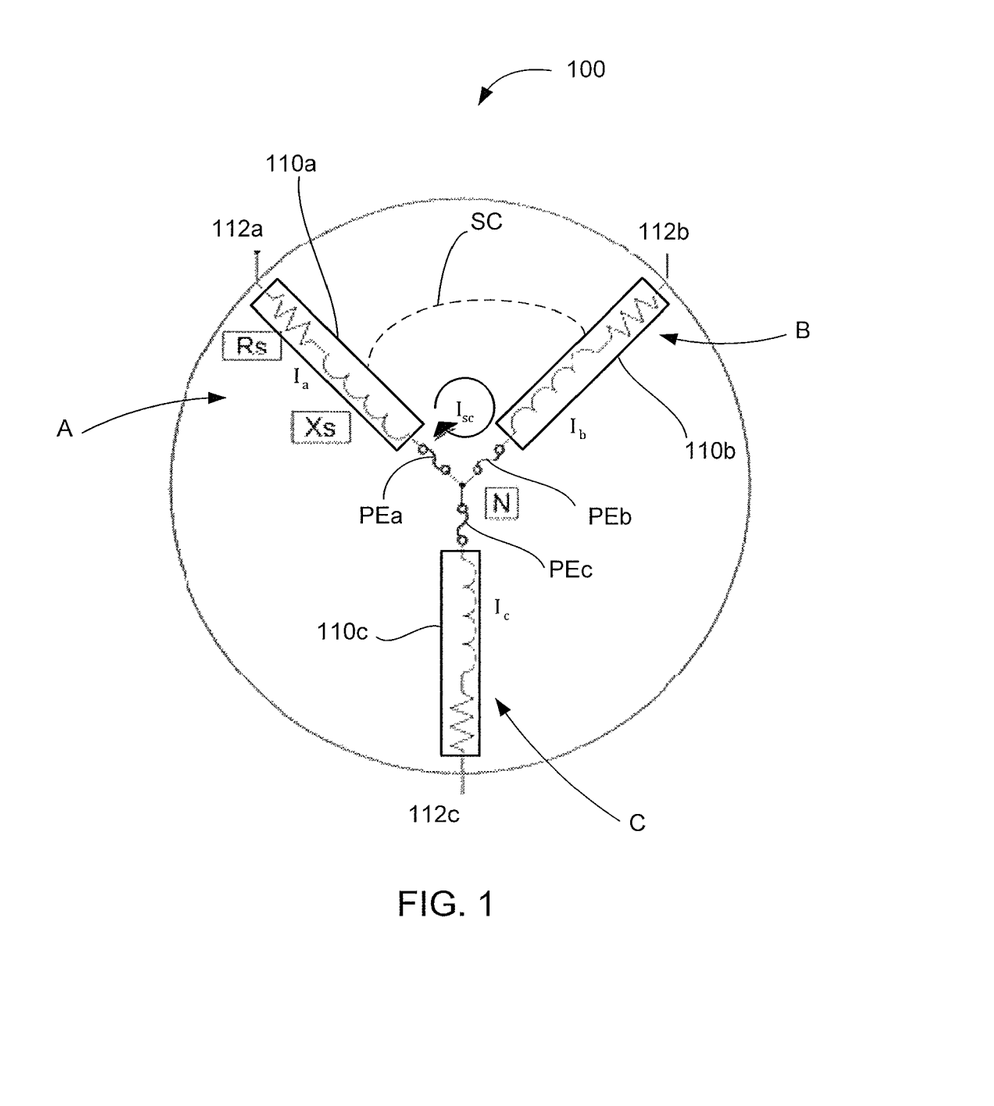
FIG. 1 illustrates a protection scheme in a wye connected motor or generator with three-phases, according to an embodiment.

FIG. 1 illustrates a wye (or star) connected electromagnetic machine 100 with three phases identified as A, B and C. Each phase includes a terminal connection (112a, 112b, and 112c), one or more coils (110a, 110b, and 110c), and one or more protective elements (PEa, PEb, and PEc). Also shown in FIG. 1 are a neutral point N and a short circuit SC.

Each of the three phases also includes at least one coil. For example, as shown in FIG. 1, coil 110a is associated with phase A, coil 110b is associated with phase B, and coil 110c is associated with phase C. Each coil can include an intrinsic resistance (shown as resistor Rs for phase A) and an intrinsic inductance (shown as inductance Xs for phase A). As discussed in further detail herein with respect to FIG. 4, current can be induced in (e.g., in a generator configuration) and/or supplied to (e.g., in a motor configuration) the machine coils 110a, 110b, and 110c. While shown in FIG. 1 as each having a single coil, the coil associated with each phase can include multiple coils.

As shown in FIG. 1, each phase includes a terminal connection (112a, 112b, and 112c). Terminal connection 112a is associated with phase A, terminal connection 112b is associated with phase B, and terminal connection 112c is associated with phase C. As shown in FIG. 1, the terminal connections (112a, 112b, and 112c) are electrically coupled to a coil (110a, 110b, or 110c) associated with the terminal connection's associated phase. For example, terminal connection 112a is electrically coupled with coil 110a, which is associated with phase A. Each terminal connection can be any suitable connection or coupling point for electrically coupling the coil associated with that phase to any other suitable circuitry. For example, the phase C terminal connection 112c can be used to electrically couple a power converter (not shown) with the phase C coil 110c. Neutral point N is the point in the wye (or star) connected machine that electrically couples the multiple phases at a single point. While shown in FIG. 1 as a three-phase machine, machine 100 can include more or fewer phases. Regardless of the number of phases, neutral point N is a point in the machine 100 where each phase is electrically coupled. In some embodiments, neutral point N can be electrically grounded. In other embodiments, machine 100 can be an ungrounded system such that neutral point N is not electrically grounded.

Short circuit SC can represent a fault condition experienced by machine 100. Under normal operating conditions, machine 100 does not experience short circuit SC. As shown in FIG. 1, short circuit SC can be an electrical short between the coils associated with phases A and B. Short circuit SC can be, however, an electrical short in the circuitry between any one or more of the phases (e.g., a short circuit between phases A, and C, a short circuit between phases B and D in a four phase machine, and/or the like). Short circuit SC can also be the result of any disruption in the circuitry outside of machine 100 that causes a fault condition in machine 100.

As shown in FIG. 1, a protective element (e.g., fuse, circuit breaker, inductor, active or passive filter, diode, etc.) is disposed between the coil of each phase and the neutral point N. Similarly stated, the protective element for each phase is disposed substantially at the neutral point N. Specifically, protective element PEa is located within phase A, protective element PEb is located within phase B, and protective element PEc is located within phase C. In a first configuration, a protective element and its associated coil can be in an electrical circuit such that current can flow through the protective element and its associated coil. For example, during normal operation, current $I_a$ can flow through phase A, current $I_b$ can flow through phase B, and current $I_c$ can flow through phase C. In the event of a fault condition associated with a phase (e.g., an internal short circuit with another phase or an external short circuit in an applied load circuit (not shown in FIG. 1)), the protective element associated with that phase can transition to a second configuration and either open to prevent current from flowing through that phase or otherwise act in a manner that substantially reduces the current that would otherwise flow through the associated phase as a result of the fault condition. In some embodiments, in the second configuration, a protective element and its associated coil can change configuration such that current is obstructed or substantially impeded from flowing through the protective element and/or its associated coil. In some embodiments, the protective element and/or its associated coil are removed from an electrical circuit in the second configuration. For example, if the coil associated with phase A short circuits with the coil associated with phase B (as illustrated in FIG. 1 by short circuit SC), current $I_{sc}$ flows through the loop defined by the short circuit SC and the neutral point N. At least one of the protective elements associated with phase A (i.e., PEa) or phase B (i.e., PEb) either opens the circuit associated with that phase, thereby removing at least one of phase A or phase B from the three-phase machine circuit, or at least one of the protective elements responds in a manner that substantially reduces the current that would otherwise flow through phase A and/or phase B. For example, if protective element PEa is a circuit breaker, when short circuit SC results in current $I_{sc}$ flowing through the loop defined by the short circuit SC and the neutral point N, if $I_{sc}$ is above the threshold of protective element PEa, protective element PEa can trip the circuit breaker, effectively opening the loop defined by the short circuit SC and the neutral point N and preventing current $I_{sc}$ from flowing through the loop defined by the short circuit SC. In such an example, protective element PEa will stop or substantially reduce the flow of current $I_{sc}$ through phase A, including current $I_a$. Protective element PEa will not, however, obstruct current $I_b$ through phase B because the protective element PEa does not affect the flow of normal current $I_b$ through phase B.

Similarly, if protective element PEb is a fuse, when short circuit SC results in current $I_{sc}$ flowing through the loop defined by the short circuit SC and the neutral point N, if $I_{sc}$ is above the threshold of protective element PEb, protective element PEb can blow the fuse, effectively opening the loop defined by the short circuit SC and the neutral point N and preventing current $I_{sc}$ from flowing through the loop defined by the short circuit SC. In that example, protective element PEb will stop or substantially reduce the flow of current $I_{sc}$ through phase B, including current $I_b$. Protective element PEb will not, however, obstruct current $I_a$ through phase A because the protective element PEb does not affect the flow of normal current $I_a$ through phase A.

In some embodiments, the protective elements PEa, PEb, and/or PEc can be active or passive. Passive protective elements include elements that do not supply energy, such as, for example, an electrical fuse, a mechanical fuse, an electrical breaker, an inductor, or a diode. Active protective elements can include elements that can inject power into a circuit, amplify a signal and/or transmit a signal, such as, for example, a feedback filter, an active current-limiting circuit, or a transistor.

In some embodiments, the protective elements PEa, PEb, and/or PEc can be fuses. In such embodiments, as the current through a protective element PEa, PEb, or PEc increases above a threshold of the fuse, the protective element PEa, PEb, or PEc breaks the loop defined by the short circuit SC and the neutral point N (i.e., the fuse blows) and removes the phase associated with that protective element from the machine winding circuit.

In some embodiments, as described above, the protective elements PEa, PEb, and/or PEc can be circuit breakers. In such embodiments, similar to a fuse, as the current through a protective element PEa, PEb, or PEc increases above a threshold, the protective element PEa, PEb, or PEc breaks the loop defined by the short circuit SC and the neutral point N (i.e., opens and/or trips the circuit breaker) and removes the phase associated with that protective element from the machine winding circuit.

In some embodiments, the protective elements PEa, PEb, and/or PEc can include an inductor in-line with the coil of a phase. Such an inductor can be used to raise the impedance for an initial transient without opening/breaking the machine winding circuit, thereby reducing the effect of a fault condition while still maintaining some level of conductivity in the associated phase circuit.

In other embodiments, the protective elements PEa, PEb, and/or PEc can include a capacitor in-line with the coil. Such a capacitor can be used to define a normal operative range of current within which a machine will operate, such that impedance substantially increases as current increases (e.g., as a result of a short circuit). As such, the capacitor will act similar to an open circuit once full. In this manner, the capacitor reduces the effect of the short circuit. Furthermore, in some embodiments, a capacitor can be applied as a low-pass filtering element, such that the transient response to a fault condition can be reduced.

In other embodiments, the protective elements PEa, PEb, and/or PEc can include an active and/or passive electrical filtering circuit. The filtering circuit can respond in a manner that reduces the effect of the fault condition. This can include reducing the initial transient response to the fault condition and/or reducing the longer-term response. This can include, for example, passive and/or active circuit elements in series with the phase coils that are selected to increase circuit impedance under conditions related to a fault, which would thereby reduce the phase currents that would be otherwise experienced under a fault condition. In still other embodiments, a mechanical device (e.g., a mechanical fuse) can be used to open the associated phase or multiple phases in response to a mechanical load (e.g., high torque), acting similarly to an electrical fuse or circuit breaker such that current flow is substantially prevented in the related phases.

In other embodiments, the protective elements PEa, PEb, and/or PEc can include a diode, which can act to substantially limit current and/or voltage in the machine winding circuit resulting from a fault condition. For example, the protective element can include a diode that substantially limits voltage applied to the machine circuit windings as a result of inductive kickback during a fault condition. In this manner, the machine can be substantially protected from insulation damage and/or arcing.

In some embodiments, the protective elements PEa, PEb, and PEc can include any combination of types of protective elements. For example, PEa can be a fuse, PEb can be an inductor, and PEc can be a circuit breaker. Furthermore, multiple protective elements can be disposed at a single location in the circuit. For example, phase A can include both an inductor and a fuse at the neutral point N (e.g., instead of single protective element PEa). Such multiple protective elements can be arranged in either a series or parallel connection.

While shown in FIG. 1 as being disposed at the neutral point N, in other embodiments, the protective elements PEa, PEb, and PEc for the phases A, B, and C can be disposed at any point in the machine winding circuit. For example, the protective elements can be disposed substantially at the phase terminal connections 112a, 112b, and 112c. For another example, each phase can include multiple coils connected in parallel or series with a protective element disposed between the coils, as described with respect to FIG. 3. Furthermore, while FIG. 1 illustrates a wye connected electromagnetic machine, in some embodiments, the electromagnetic machine can be delta connected, as described with respect to FIG. 2.

Figure 2:
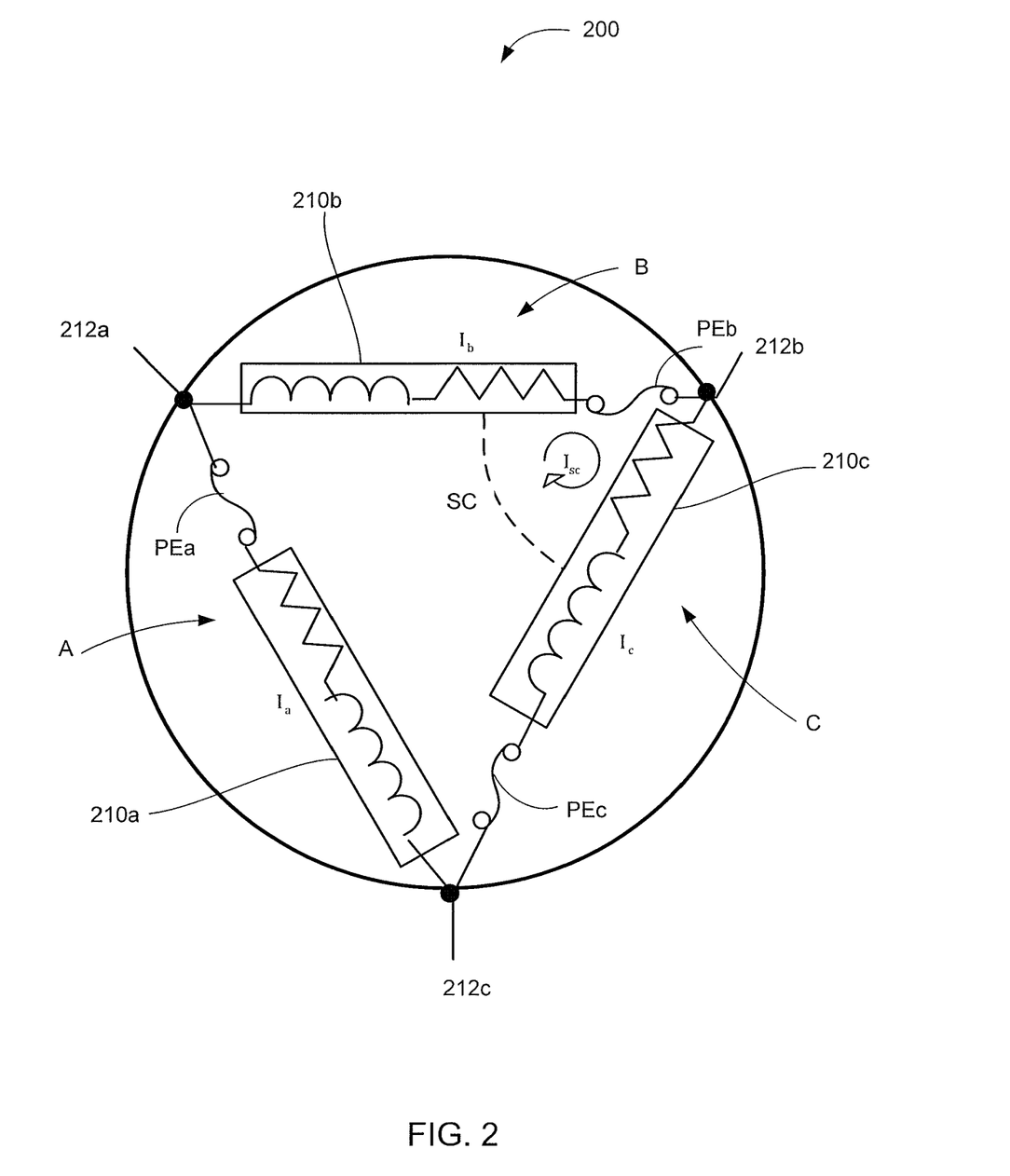
FIG. 2 illustrates a protection scheme in a delta connected motor or generator with three-phases, according to an embodiment.

FIG. 2 illustrates a delta connected electromagnetic machine 200 having three phases A, B, and C. Each phase includes a terminal connection. For example, terminal connection 212a is associated with phase A, terminal connection 212b is associated with phase B, and terminal connection 212c is associated with phase C. Each phase also includes one or more coils (e.g., coil 210a is associated with phase A, coil 210b is associated with phase B, and coil 210c is associated with phase C. Each phase also includes a protective element PEa, PEb, and PEc associated with phase A, phase B, and phase C, respectively.

The coils 210a, 210b, and 210c are structurally and functionally similar to the coils 110a, 110b, and 110c shown and described with respect to FIG. 1. Additionally, the protective elements PEa, PEb, and PEc are structurally and functionally similar to the protective elements shown and described with respect to FIG. 1. Moreover, the terminal connections 212a, 212b, and 212c are structurally and functionally similar to the terminal connections 112a, 112b, and 112c shown and described with respect to FIG. 1.

While shown as disposed substantially at the terminal connections 212a, 212b, and 212c in FIG. 2, the protective elements PEa, PEb, and PEc can be disposed in any suitable location. For example, the protective elements can be disposed near and/or substantially at an opposite terminal connection of the phase than is shown. Furthermore, one or more protective elements can be disposed within each phase, including between multiple series and/or parallel connected coils within the phase as described herein with respect to FIG. 3.

In a delta connected configuration such as FIG. 2, prior to any fault condition, current $I_a$ can flow through phase A, current $I_b$ can flow through phase B, and current $I_c$ can flow through phase C. A short circuit SC can occur between two phases (e.g., phases B and C as depicted in FIG. 2). As shown in FIG. 2, for example, upon such a fault condition, current $I_{sc}$ can flow in the loop defined by the short circuit and the terminal connection 212b. In some instances, protective element PEb can respond to the current $I_{sc}$ by opening (i.e., breaking the loop in which current $I_{sc}$ flows), thereby removing phase B from the three-phase machine circuit. In other instances, PEb can respond to the current $I_{sc}$ by reducing the current $I_b$ that would otherwise flow through phase B by substantially reducing the current $I_{sc}$. When protective element PEb obstructs the flow of current $I_{sc}$ through phase B, protective element PEb will also obstruct the flow of current $I_b$ through phase B. Protective element PEb will not, however, obstruct the flow of current $I_c$ through phase C. As described herein with respect to FIG. 3, additional protective elements can be placed within each phase to improve the protection provided by the configuration. For example, an additional protective element can be disposed between coil 210c and terminal connection 212b. In such an embodiment, the effects of short circuit SC can be mitigated by two protective elements.

Figure 3:
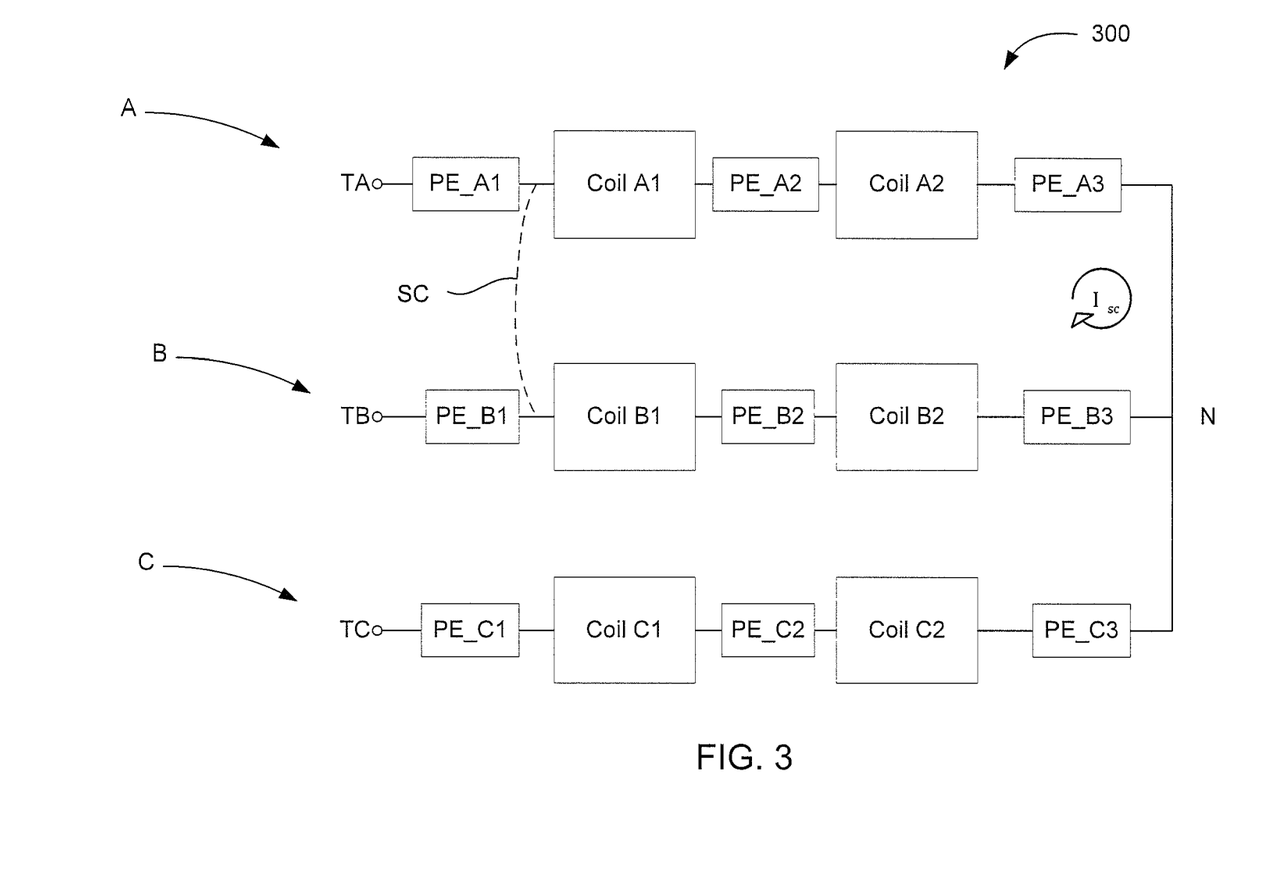
FIG. 3 illustrates multiple protection elements disposed within a circuit, according to an embodiment.

FIG. 3 illustrates a wye (or star) connected electromagnetic machine 300 having multiple protection elements disposed within a machine winding circuit having three phases A, B, and C. Similar to FIG. 1, each phase includes a terminal connection TA, TB, and TC. The terminal connections TA, TB, and TC shown in the embodiment of FIG. 3 are structurally and functionally similar to the terminal connections 112a, 112b, and 112c described with respect to FIG. 1 and are therefore not described in further detail herein. Each phase also includes multiple coils: coil A1 and coil A2 associated with phase A, coil B1 and coil B2 associated with phase B, and coil C1 and coil C2 associated with phase C. Additionally, each phase includes multiple protective elements: PE_A1, PE_B1, PE_C1, PE_A2, PE_B2, PE_C2, PE_A3, PE_B3, and PE_C3. Electromagnetic machine 300 is shown having a neutral point N and short circuit SC.

Each phase shown in FIG. 3 includes two coils coupled together in a series configuration. Specifically, phase A includes coil A1 in series with coil A2, phase B includes coil B1 in series with coil B2, and phase C includes coil C1 in series with coil C2. In other embodiments, each phase can include any number of coils electrically coupled in series and/or parallel with the other coils of that phase.

FIG. 3 illustrates that phases A, B, and C can have protection elements PE_A1, PE_B1, and PE_C1 at the phase terminal connections (TA, TB, and TC). Additionally, phases A, B, and C can include protection elements PE_A2, PE_B2, and PE_C2 located between the coils of each phase (e.g., protection element PE_A2 between coil A1 and coil A2, protection element PE_B2 between coil B1 and coil B2, and protection element PE_C2 between coil C1 and coil C2). Further, phases A, B, and C can include protection elements PE_A3, PE_B3, and PE_C3 at the neutral point N. Protection elements PE_A1, PE_B1, PE_C1, PE_A2, PE_B2, PE_C2, PE_A3, PE_B3, and PE_C3 can be structurally and functionally similar to protection elements PEa, PEb, and PEc described above with respect to FIG. 1. Thus, each protection element PE_A1, PE_B1, PE_C1, PE_A2, PE_B2, PE_C2, PE_A3, PE_B3, PE_C3 can be a fuse, circuit breaker, inductor, passive and/or active electrical filter, mechanical device, and/or the like.

Including multiple protective elements for each phase A, B, and C can increase the protection of the circuit by either eliminating or substantially reducing currents flowing through faulted phases under various fault locations more effectively. Additionally, including multiple protective elements per phase can reduce the response time for either eliminating or substantially reducing the current flowing through a phase upon failure of that phase. Specifically, having multiple protective elements increases the number of places in the machine winding circuit that can respond to an electrical failure. For example, if a coil A1 associated with phase A short circuits with a coil B1 associated with phase B (as illustrated in FIG. 3 by short circuit SC), current $I_{sc}$ can flow through the loop defined by short circuit SC and the neutral point N. One or more of the protective elements PE_A2, PE_A3, PE_B2 and/or PE_B3 can open the circuit or respond in a manner that substantially reduces or stops the current flowing through the loop. In such an example, protective element PE_A2 can be, for example, a fuse, which can open the circuit before current $I_{sc}$ reaches coil A2, thereby reducing the potential for damage to coil A2 and/or other components within phases A and B. Furthermore, in the event that protective element PE_A2 does not respond to current $I_{sc}$, three other protective elements PE_A3, PE_B2, and PE_B3 remain within the loop defined by short circuit SC and neutral point N to substantially reduce or stop current $I_{sc}$ from looping through the circuit and causing damage.

In some embodiments, each protection element PE_A1, PE_B1, PE_C1, PE_A2, PE_B2, PE_C2, PE_A3, PE_B3, and PE_C3 can communicate with the other protection elements in the machine winding circuit. In such embodiments, a first protection element (e.g., PE_A1) can provide a signal (electrical, mechanical, or otherwise) to a second protection element (e.g., PE_A2) upon recognizing a failure. This signal can cause the second protection element (e.g., PE_A2) to respond, either opening the phase circuit or substantially reducing the fault current that would otherwise flow through the associated phase. Thus, both the first protection element (e.g., PE_A1) and the second protection element (e.g., PE_A2) can respond to a failure recognized by the first protection element (e.g., PE_A1). This can cause a cascading effect in the circuit to remove and/or isolate multiple portions of the circuit, increasing the speed and/or effectiveness of the machine winding circuit protection.

In some embodiments, this communication can be between protection elements of a single phase. In such embodiments, for example, if protection element PE_A1 recognizes a failure (e.g., an increase in current caused by a short circuit), protection element PE_A1 can send a signal to protection element PE_A2 and/or protection element PE_A3 to cause protection element PE_A2 and/or protection element PE_A3 to also open or otherwise respond to the fault. In this manner, phase A can be isolated from the circuit at multiple points in the machine winding circuit.

In some embodiments, the communication between protection elements can be between phases. In such embodiments, for example, if protection element PE_A1 recognizes a failure (e.g., an increase in current caused by a short circuit), protection element PE_A1 can send a signal to protection element PE_B1 and/or protection element PE_C1 to cause protection element PE_B1 and/or protection element PE_C1 to also open or otherwise respond to the fault.

In some embodiments, the signals sent between protection elements can be via a wired and/or wireless communication network between the protection elements. For example, each protection element can include a communication module implemented in a processing device (e.g., an application specific integrated circuit (ASIC), a field programmable gate array (FPGA), a digital signal processor (DSP), a general purpose processing device, and/or the like). The communication module of each protection element can communicate with the communication module of the other protection elements. In other embodiments the signal sent can be via a mechanical load and/or displacement. For example, a first protection element can include a mechanical actuator that applies a load to a second protection element, thereby causing the second protection element to respond to the fault originally acting on the first protective element. In other embodiments, any other suitable form of communication can be implemented between the protection elements.

While shown in FIG. 3 as being implemented in a wye (or star) configuration, a similar approach can be used in a delta configuration. Specifically, in a delta configuration, protection elements can be placed at any suitable location, as shown with respect to FIG. 2. Additionally, for example, protection elements can be placed at multiple points within a phase, including where two phases intersect, and/or alternatively within a series of phase coils between such intersections.

Moreover, while shown as being used for a three-phase system, such protection elements can be used in a system with any number of phases and/or coils.

Figure 4:
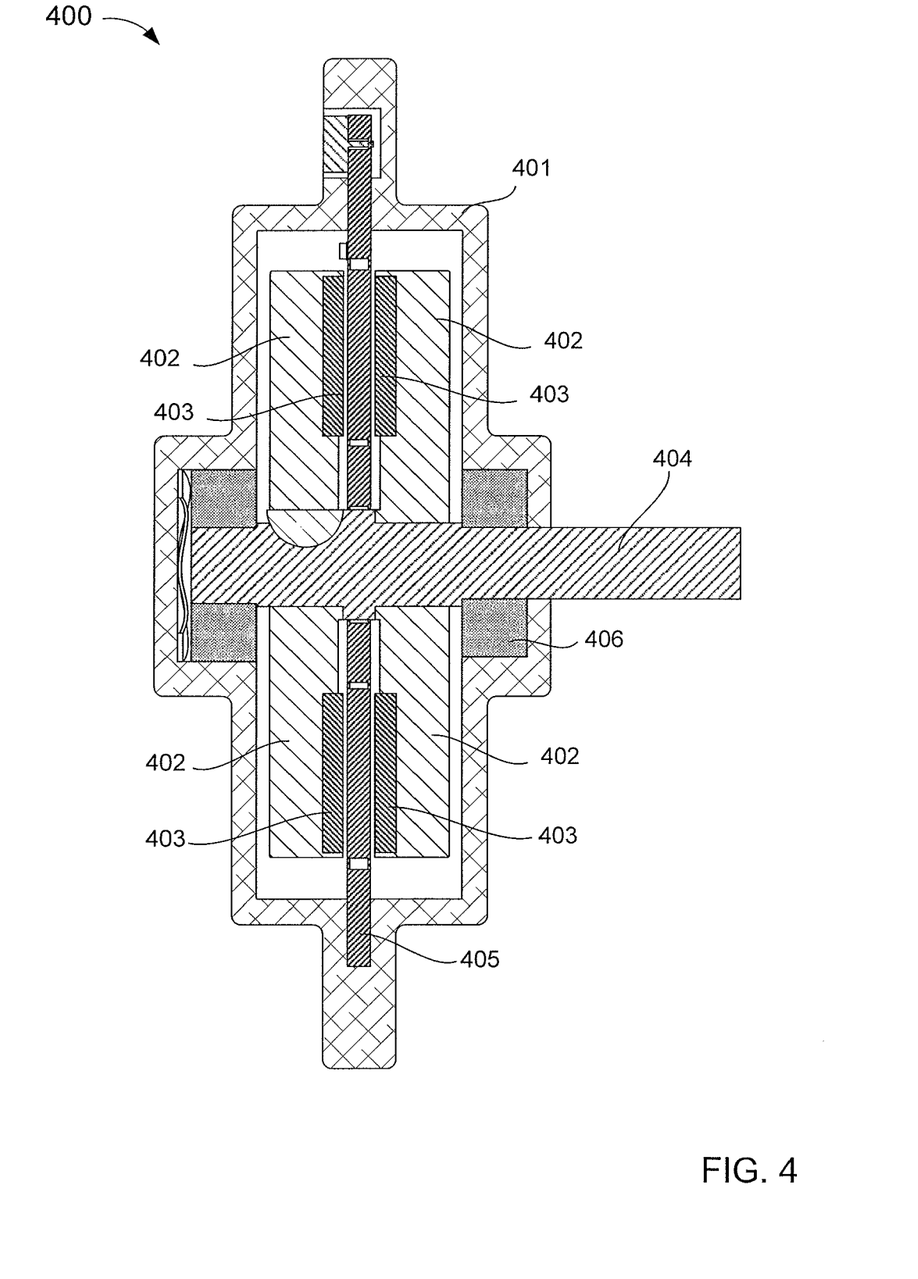
FIG. 4 is a cross-sectional illustration of an axial flux machine structure 400 according to an embodiment.

Any of the embodiments described herein can be included in an electromagnetic machine such as, for example, an axial flux, radial flux, transverse flux, or linear machine. The electromagnetic machine can be operated as a motor and/or a generator. For example, FIG. 4 is a cross-sectional illustration of an axial flux machine structure 400 according to an embodiment. In some embodiments, the machine structure 400 can be included in a wind turbine or the like.

The machine structure 400 includes a housing 401, a rotor assembly 402, and an annular stator assembly 405. The housing 401 substantially encloses the rotor assembly 402 and the stator assembly 405. The stator assembly 405 can be coupled to the housing 401 such that the stator assembly 405 remains in a substantially fixed position within the housing 401. The stator assembly 405 can include or support, for example, an air core type stator to support a set of conductive windings. Furthermore the stator assembly 405 can be segmented to include any number of stator portions that can be substantially similar to stator portions described in U.S. Patent Application Publication No. 2011/0273048, the disclosure of which is incorporated herein by reference in its entirety. Each stator portion can include at least one laminated composite assembly (e.g., at least one PCB) with one or more electrical circuits including one or more stator windings. In some embodiments, the laminated composite assemblies can be similar to those described in U.S. Pat. No. 7,109,625, the disclosure of which is incorporated herein by reference in its entirety. In some embodiments, an electrical circuit on the laminated composite assembly can include one or more protection elements, as described herein. In other embodiments, the protective elements can be located outside the laminated composite stator assembly, but in locations that are electrically equivalent to those locations previously described.

The rotor assembly 402 can include multiple rotor elements or portions that can be coupled together to form the rotor assembly 402. For example, in some embodiments, the rotor assembly 402 can include rotor portions similar to those described in U.S. patent application Ser. Nos. 13/568,791 and 13/152,164, the disclosures of which are incorporated herein by reference in their entireties. The rotor assembly 402 is coupled to a drive shaft 404 that is at least partially disposed within a set of bearings 406. Therefore, the drive shaft 404 can be rotated relative to the housing 401 (e.g., either directly or indirectly by a mechanical force). Moreover, with the rotor assembly 402 coupled to the drive shaft 404, the rotor assembly 402 is rotated with the drive shaft 404. Thus, the rotor assembly 402 can rotate relative to the stator assembly 405.

The rotor assembly 402 supports and/or is coupled to a set of magnetic assemblies 403. In some embodiments, the magnetic assemblies 404 can be similar to those described in U.S. patent application Ser. Nos. 13/692,083, 13/437,639, and Ser. No. 13/438,062, the disclosures of which are incorporated herein by reference in their entireties. In this manner, as the rotor assembly 402 is rotated relative to the stator assembly 405, a magnetic flux flows between the poles of the magnetic assemblies 403. Thus, an electric field is induced in or on the conductive windings of the stator assembly 405 that when properly gathered and delivered allows the machine structure 400 to behave as a generator or alternator. Conversely, an application of an electrical current to the conductive material of the stator assembly 405 produces Lorentz forces between the flowing current and the magnetic field of the magnetic assemblies 403. The resultant force is a torque that rotates rotor assembly 402. Thus, the drive shaft 404 is rotated thereby doing work. In this manner, the machine structure 400 can behave as a motor or actuator.

While the protective elements are described herein as being disposed on a machine stator winding circuit, in other embodiments, a similar approach can be taken with a machine rotor winding circuit. Specifically, in a wound rotor application such as an induction machine, for example, such protection elements as those described above can be placed at any suitable location in the machine rotor winding circuit.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

What is claimed is:

1. An apparatus, comprising:
    a plurality of coils of a multi-phase machine, each coil from the plurality of coils being associated with a different electrical phase from a plurality of electrical phases of the multi-phase machine; and
    a plurality of protective elements, each protective element from the plurality of protective elements being associated with a different coil from the plurality of coils, each coil from the plurality of coils being part of an electrical circuit when its associated protective element from the plurality of protective elements is in a first configuration, each coil from the plurality of coils being disposed between its associated protective element and a phase terminal connection associated with its associated electrical phase from the plurality of electrical phases,
    a protective element from the plurality of protective elements is configured to allow a first amount of current through its associated coil from the plurality of coils when in the first configuration, the protective element configured to allow a second amount of current through its associated coil from the plurality of coils when in a second configuration, the protective element configured to not obstruct current flow through the coils from the plurality of coils that are not associated with the protective element when in the second configuration.

2. The apparatus of claim 1, wherein each protective element from the plurality of protective elements is configured to remove its associated coil from the plurality of coils from the electrical circuit but not remove the remaining coils from the plurality of coils from the electrical circuit when in the second configuration.

3. The apparatus of claim 1, wherein each protective element from the plurality of protective elements is disposed between its associated coil from the plurality of coils and a neutral point.

4. The apparatus of claim 1, wherein the plurality of coils are arranged in a wye configuration.

5. The apparatus of claim 1, wherein the plurality of coils are arranged in a delta configuration.

6. The apparatus of claim 1, wherein the protective element is configured to transition from the first configuration to the second configuration in response to a short circuit between its associated coil from the plurality of coils and another coil from the plurality of coils.

7. The apparatus of claim 1, wherein each coil from the plurality of coils is configured such that a voltage is induced in each coil from the plurality of coils in response to a magnetic field from a rotor moving with respect to the plurality of coils.

8. The apparatus of claim 1, wherein each protective element from the plurality of protective elements includes at least one of an electrical fuse, a mechanical fuse, an electrical breaker, an inductor, or a diode.

9. The apparatus of claim 1, wherein the second amount of current is substantially zero.

10. The apparatus of claim 1, wherein the plurality of protective elements is a first plurality of protective elements, the apparatus further comprising:
    a second plurality of protective elements, each protective element from the second plurality of protective elements being disposed between its associated coil from the plurality of coils and the phase terminal connection associated with its associated electrical phase from the plurality of electrical phases.

11. The apparatus of claim 1, wherein the plurality of coils is a first plurality of coils, the apparatus further comprising:
    a second plurality of coils of the multi-phase machine, each coil from the second plurality of coils being associated with a different electrical phase from the plurality of electrical phases, each protective element from the plurality of protective elements being associated with a different coil from the second plurality of coils, each protective element from the plurality of protective elements being disposed in series between its associated coil from the first plurality of coils and its associated coil from the second plurality of coils.

12. The apparatus of claim 1, wherein the multi-phase machine is a multi-phase electromagnetic generator or motor.

13. An apparatus, comprising:
    a plurality of coils of a multi-phase machine, each coil from the plurality of coils being associated with a different electrical phase from a plurality of electrical phases of the multi-phase machine; and
    a plurality of passive protective elements disposed within the multi-phase machine, each passive protective element from the plurality of passive protective elements being arranged in series with a different coil from the plurality of coils,
    each coil from the plurality of coils is disposed between its associated passive protective element from the plurality of passive protective elements and a phase terminal connection associated with an electrical phase from the plurality of electrical phases, a passive protective element from the plurality of passive protective elements is configured to allow a first amount of current through its associated coil from the plurality of coils when in a first configuration, the passive protective element configured to allow a second amount of current through its associated coil from the plurality of coils when in a second configuration.

14. The apparatus of claim 13, wherein each passive protective element from the plurality of passive protective elements includes at least one of an electrical fuse, a mechanical fuse, an electrical breaker, an inductor, or a diode.

15. The apparatus of claim 13, wherein each passive protective element from the plurality of passive protective elements is disposed between its associated coil from the plurality of coils and a neutral point.

16. The apparatus of claim 13, wherein the plurality of passive protective elements is a first plurality of passive protective elements, the apparatus further comprising:

a second plurality of passive protective elements, each coil from the plurality of coils being arranged in series with a passive protective element from the first plurality of passive protective elements and a passive protective element from the second plurality of passive protective elements.

17. The apparatus of claim 13, wherein the plurality of coils are arranged in a wye configuration.

18. The apparatus of claim 13, wherein the plurality of coils are arranged in a delta configuration.

19. The apparatus of claim 13, wherein the passive protective element is configured to transition from the first configuration to the second configuration in response to a short circuit between its associated coil from the plurality of coils and another coil from the plurality of coils.

20. The apparatus of claim 13, wherein each coil from the plurality of coils is configured such that a voltage is induced in each coil from the plurality of coils in response to a magnetic field from a rotor moving with respect to the plurality of coils.

21. The apparatus of claim 13, wherein each passive protective element from the plurality of passive protective elements includes at least one of an electrical fuse, a mechanical fuse, an electrical breaker, an inductor, or a diode.

22. The apparatus of claim 13, wherein the second amount of current is substantially zero.

23. An apparatus, comprising:

a plurality of coils of a multi-phase machine, each coil from the plurality of coils being associated with a different electrical phase from a plurality of electrical phases of the multi-phase machine; and a plurality of protective elements, each protective element from the plurality of protective elements being associated with a different coil from the plurality of coils, each protective element from the plurality of protective elements is disposed between its associated coil and a phase terminal connection associated with an electrical phase from the plurality of electrical phases, a protective element from the plurality of protective elements is configured to allow a first amount of current through its associated coil from the plurality of coils when in a first configuration, the protective element configured to allow a second amount of current through its associated coil from the plurality of coils when in a second configuration.

24. The apparatus of claim 23, wherein the protective element from the plurality of protective elements is a first protective element from the plurality of protective elements, the first protective element configured to provide an indication to a second protective element from the plurality of protective elements when the first protective element transitions from the first configuration to the second configuration, a coil from the plurality of coils and associated with the second protective element is part of an electrical circuit when the second protective element is in the first configuration, the second protective element configured to remove the coil from the electrical circuit in response to the indication.

25. The apparatus of claim 23, wherein each protective element from the plurality of protective elements includes at least one of an electrical fuse, a mechanical fuse, an electrical breaker, an inductor, or a diode.

26. The apparatus of claim 23, wherein the plurality of protective elements is a first plurality of protective elements, the apparatus further comprising:

a second plurality of protective elements, each coil from the plurality of coils being associated with a protective element from the first plurality of protective elements and a protective element from the second plurality of protective elements.

27. The apparatus of claim 23, wherein the protective element is configured to transition from the first configuration to the second configuration in response to a short circuit between its associated coil and another coil from the plurality of coils.

28. The apparatus of claim 23, wherein the plurality of coils are arranged in a wye configuration.

29. The apparatus of claim 23, wherein the plurality of coils are arranged in a delta configuration.

30. The apparatus of claim 23, wherein each coil from the plurality of coils is configured such that a voltage is induced in each coil from the plurality of coils in response to a magnetic field from a rotor moving with respect to the plurality of coils.

31. The apparatus of claim 23, wherein each protective element from the plurality of protective elements includes at least one of an electrical fuse, a mechanical fuse, an electrical breaker, an inductor, or a diode.

32. The apparatus of claim 23, wherein the second amount of current is substantially zero.

33. The apparatus of claim 23, wherein the protective element from the plurality of protective elements is a first protective element from the plurality of protective elements, the first protective element configured to provide an indication to a second protective element from the plurality of protective elements when the first protective element transitions from the first configuration to the second configuration.

* * * * *